US011104574B2

(12) United States Patent
Green et al.

(10) Patent No.: US 11,104,574 B2
(45) Date of Patent: Aug. 31, 2021

(54) HYDROGEN SULFIDE MEDIATED WATER SPLITTING FOR HYDROGEN GAS AN SULFUR DIOXIDE PRODUCTION

(71) Applicant: Massachusetts Institute of Technology, Cambridge, MA (US)

(72) Inventors: William Green, Belmont, MA (US); Ryan Gillis, Lake Jackson, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/959,441

(22) PCT Filed: Jan. 10, 2019

(86) PCT No.: PCT/US2019/013018
§ 371 (c)(1),
(2) Date: Jul. 1, 2020

(87) PCT Pub. No.: WO2019/140068
PCT Pub. Date: Jul. 18, 2019

(65) Prior Publication Data
US 2020/0369518 A1 Nov. 26, 2020

Related U.S. Application Data

(60) Provisional application No. 62/616,181, filed on Jan. 11, 2018.

(51) Int. Cl.
*C01B 3/04* (2006.01)
*C01B 17/04* (2006.01)
(Continued)

(52) U.S. Cl.
CPC ............... *C01B 3/04* (2013.01); *C01B 3/52* (2013.01); *C01B 3/56* (2013.01); *C01B 7/135* (2013.01);
(Continued)

(58) Field of Classification Search
CPC ... C01B 3/56; C01B 17/0473; C01B 17/0495; C01B 7/135; C01B 17/508; C01B 3/52;
(Continued)

(56) References Cited

U.S. PATENT DOCUMENTS 4,021,323 A 5/1977 Kilby et al.
4,066,739 A 1/1978 Chen
(Continued)

FOREIGN PATENT DOCUMENTS

WO 2015/088337 A1 6/2015

OTHER PUBLICATIONS

International Search Report and Written Opinion dated May 22, 2019 in corresponding PCT application No. PCT/US2019/013018.
(Continued)

*Primary Examiner* — Timothy C Vanoy
(74) *Attorney, Agent, or Firm* — Nields, Lemack & Frame, LLC

(57) ABSTRACT

The present disclosure describes a hydrogen sulfide decomposition process for converting hydrogen sulfide into hydrogen gas and sulfur dioxide. Such a process can significantly increase the amount of available hydrogen gas. In fact, if each Claus unit in the U.S. creating elemental sulfur in traditional systems were replaced by this hydrogen sulfide decomposition process, 1.83 million metric tons of hydrogen gas could be produced. This represents about 20% of the annual hydrogen produced in the U.S. for any purpose, recovered and available for reuse. Additionally, if desired, the sulfur dioxide can be further processed to form sulfuric acid.

19 Claims, 2 Drawing Sheets

(51) Int. Cl.
  *C01B 17/50*   (2006.01)
  *C01B 3/52*    (2006.01)
  *C01B 3/50*    (2006.01)
  *C01B 7/13*    (2006.01)
  *C01B 3/56*    (2006.01)

(52) U.S. Cl.
  CPC ...... *C01B 17/0473* (2013.01); *C01B 17/0495* (2013.01); *C01B 17/508* (2013.01)

(58) Field of Classification Search
  CPC . C01B 3/04; C01B 3/065; Y02E 60/36; B01J 10/00; B01J 19/00; B01J 19/24; B01J 2219/00002; B01J 2219/24; B01J 2219/2401
  See application file for complete search history.

(56) References Cited

U.S. PATENT DOCUMENTS

| | | | |
|---|---|---|---|
| 4,094,962 | A  | 6/1978  | Cocuzza et al. |
| 4,127,644 | A  | 11/1978 | Norman et al. |
| 4,258,026 | A  | 3/1981  | O'Keefe |
| 6,375,907 | B1 | 4/2002  | Gallup |
| 2014/0037526 | A1 | 2/2014 | Felch et al. |
| 2015/0315022 | A1 | 11/2015 | Perez |

OTHER PUBLICATIONS

Iggland et al., "Introduction to Chemical Engineering for Lecture 7: Flash Distillation", ETH Zurich, Institute of Process Engineering, 2015.

HYDROGEN SULFIDE MEDIATED WATER SPLITTING FOR HYDROGEN GAS AN SULFUR DIOXIDE PRODUCTION

This application claims priority of U.S. Provisional Patent Application Ser. No. 62/616,181, filed Jan. 11, 2018, the disclosure of which is incorporated herein by reference in its entirety.

FIELD

The present invention is in the technical field of chemical manufacturing, and more specifically the manufacture of sulfur dioxide and hydrogen from hydrogen sulfide and water using iodine intermediates.

BACKGROUND

Hydrogen sulfide is present in significant quantities in many natural gas reserves, especially in southeast Asia, northwest Australia, the central North America, the Middle East, and North Africa. Additionally, hydrogen sulfide is the principal product of most hydrocarbon desulfurization processes, created as hydrogen gas reacts with a sulfur-containing hydrocarbon over a catalyst. These hydrogen sulfide streams are either reacted to form sulfuric acid or, on a very large scale, converted to solid elemental sulfur through the Claus process.

More specifically, the toxic gas hydrogen sulfide ($H_2S$) is created in large quantities as a byproduct of fuel desulfurization. It is also co-produced with natural gas. $H_2S$ needs to be converted into less toxic components. The current technology for converting $H_2S$ is the Claus process, with the net overall reaction $H_2S+\frac{1}{2}O_2 \rightarrow S+H_2O$.

To provide a sense of the scale of applicability, consider that the U.S. Geologic Survey reports that 9.78 million metric tons of sulfur were produced in the United States in 2016, almost completely as a byproduct of hydrocarbon refining.

It would be beneficial if there were a hydrogen sulfide decomposition process to convert this hydrogen sulfide into hydrogen gas and sulfur dioxide, which could in turn be used to generate sulfuric acid or other chemicals.

SUMMARY

The present disclosure describes a hydrogen sulfide decomposition process for converting hydrogen sulfide into hydrogen gas and sulfur dioxide. Such a process can significantly increase the amount of available hydrogen gas. In fact, if each Claus unit in the U.S. creating elemental sulfur in traditional systems were replaced by this hydrogen sulfide decomposition process, 1.83 million metric tons of hydrogen gas could be produced. This represents about 20% of the annual hydrogen produced in the U.S. for any purpose, recovered and available for reuse. When the whole world, not just the U.S., is considered, the potential benefit is even larger. Additionally, if desired, the sulfur dioxide can be further processed to form sulfuric acid.

According to one embodiment, a method of decomposing hydrogen sulfide is disclosed. The method comprises reacting hydrogen sulfide with water and iodine to create sulfur dioxide and hydroiodic acid. In certain embodiments, the method further comprises reacting the hydroiodic acid to form hydrogen gas. In some embodiments, the sulfur dioxide is subjected to a contact process to create sulfuric acid. In some embodiments, the sulfur dioxide is reacted with additional hydrogen sulfide to form elemental sulfur. In some embodiments, the reacting of hydrogen sulfide with water and iodine creates a liquid stream, and the sulfur dioxide is separated from the liquid stream, such as by partially flashing the liquid stream. In certain embodiments, the hydroiodic acid is subjected to a vaporization process to form gaseous hydrogen iodide. In some embodiments, the gaseous hydrogen iodide is decomposed into a reactor effluent stream comprising hydrogen gas and iodine. In certain embodiments, the decomposition is performed using a catalyst or thermal decomposition. In certain embodiments, the hydrogen gas is separated from the reactor effluent stream, such as by a flash process. In some embodiments, the remainder of the reactor effluent stream is recycled to react with additional hydrogen sulfide.

According to another embodiment, a method of creating hydrogen from hydrogen sulfide is disclosed. The method comprises contacting hydrogen sulfide with water and iodine to create sulfur dioxide and hydroiodic acid and decomposing the hydroiodic acid to create hydrogen gas.

According to another embodiment, a chemical plant to create hydrogen from hydrogen sulfide is disclosed. The chemical plant comprises a first reactor to react the hydrogen sulfide with iodine and water to form a mixture of dissolved hydroiodic acid and sulfur dioxide; a first vapor-liquid separator to separate the sulfur dioxide from the mixture; a second reactor to dissociate the hydroiodic acid into a reactor effluent stream comprising hydrogen and iodine; and a second vapor-liquid separator to separate the hydrogen from the reactor effluent stream. In certain embodiments, the plant comprises an absorption or adsorption unit to purify the sulfur dioxide and/or an absorption or adsorption unit to purify the hydrogen.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
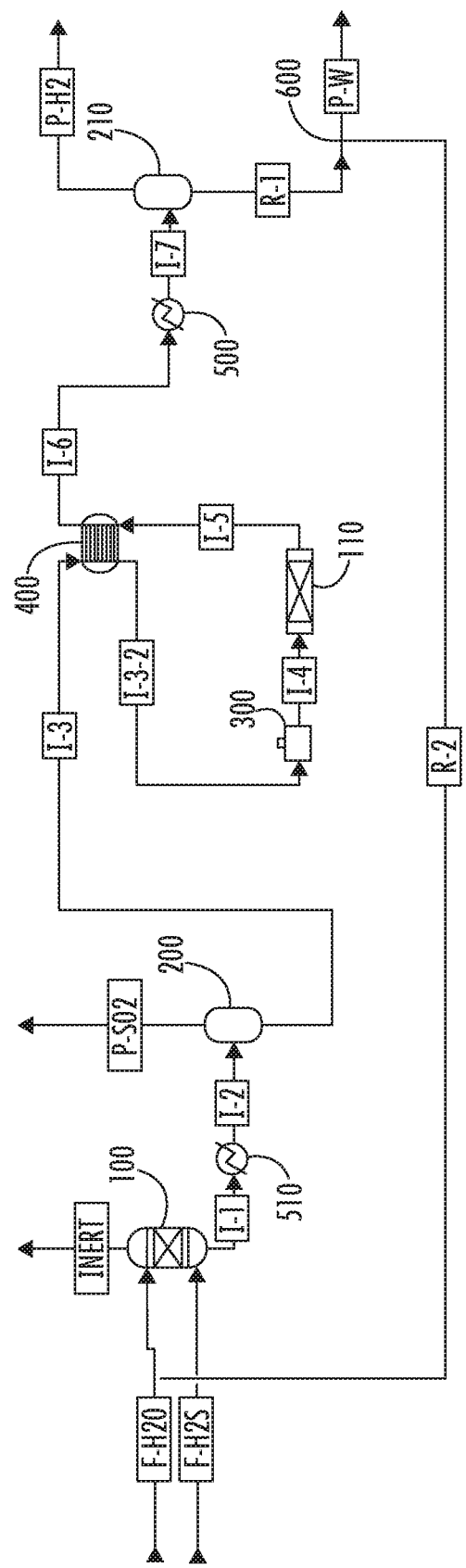
FIG. 1 is a flowchart showing the production of hydrogen gas according to one embodiment.

The purpose of the proposed hydrogen sulfide decomposition process is to produce hydrogen gas and sulfur dioxide (which can then be converted into sulfuric acid if desired) from hydrogen sulfide, water, and iodine. This would partially replace the Claus process as a method for hydrogen sulfide treatment and steam methane reforming as a method of hydrogen gas production.

As stated above, this hydrogen sulfide decomposition process can significantly increase the amount of available hydrogen gas. The value of hydrogen fluctuates (and often it is produced and consumed inside the same refinery or chemical plant so there is not a posted market price), but quoted costs of production are over $1,000/ton. Hence, the portion of the existing hydrogen demand that could be filled by this new process is valued at billions of dollars per year. The most practiced existing process for hydrogen production is steam reforming of methane or other hydrocarbons, a process that creates and emits a large quantity of carbon dioxide into the environment. For example, steam methane reforming, as commonly practiced, emits approximately 7-10 tons of $CO_2$ per ton of $H_2$ created. This emission intensity can be significantly reduced using the new hydrogen sulfide mediated water splitting process described herein. The significant reduction in carbon dioxide emissions further motivates this design over existing technology.

This hydrogen sulfide decomposition process may be of special value to refining operations in that they both produce the vast majority of the hydrogen sulfide and consume the majority of the hydrogen gas. Thus, the same parties that would be interested in this with regards to hydrogen sulfide treatment, also stand to benefit the most from the hydrogen production.

Viewing the new proposed technology as a hydrogen sulfide treatment method, this process has a fundamental economic advantage over the Claus process in that it creates valuable hydrogen gas. Additionally, much lower temperatures are required by this cycle compared to the Claus process, a benefit from both a financial and safety standpoint.

Viewing this technology as a hydrogen ($H_2$) production method, this process could produce hydrogen gas at similar costs and much lower environmental impact than traditional hydrogen generation methods. Steam reforming methods in particular are low cost but release large amounts of carbon dioxide. The proposed method creates hydrogen gas from hydrogen sulfide and water and thus has no inherent carbon dioxide emissions.

The following series of reactions allows the creation of $SO_2$ and $H_2$ from $H_2S$ and $H_2O$, using iodine. Note that the $I_2$ is recycled after $H_2$ formation.

The first overall reaction is for the formation of HI.

$$H_2S + 3I_2 + 2H_2O \rightarrow 6HI + SO_2 \quad \text{HI Formation}$$

A second overall reaction is for the decomposition of HI.

$$2HI \leftrightarrow H_2 + I_2 \quad \text{HI Decomposition}$$

The net overall reaction is

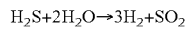

$$H_2S + 2H_2O \rightarrow 3H_2 + SO_2$$

One embodiment of the process will involve the following key steps which are shown in FIG. 1.

First, the $H_2S$ is reacted with $I_2$ and $H_2O$ to form a mixture of dissolved HI and $SO_2$. This is denoted as I-1 in FIG. 1. This is done in a first reactor 100, which may be a bubble column, a spray tower, an agitated tank reactor or any other suitable device. The reaction is performed preferably at a temperature between 20 and 150 degrees Celsius and a pressure between 1 and 45 bars, with the product mixture preferably having a hydroiodic acid concentration between 20 and 56 weight percent. The mixture of dissolved HI and $SO_2$, I-1, is then heated in heater 510, which could be a combustion furnace, heat exchanger, or other source, and emerges as a heated mixture, I-2, in FIG. 1. A gas effluent stream, represented as INERT, is also shown as an output from the first reactor 100. This gas effluent stream may contain diluents or impurities that are not used by the rest of the process.

Figure 2:
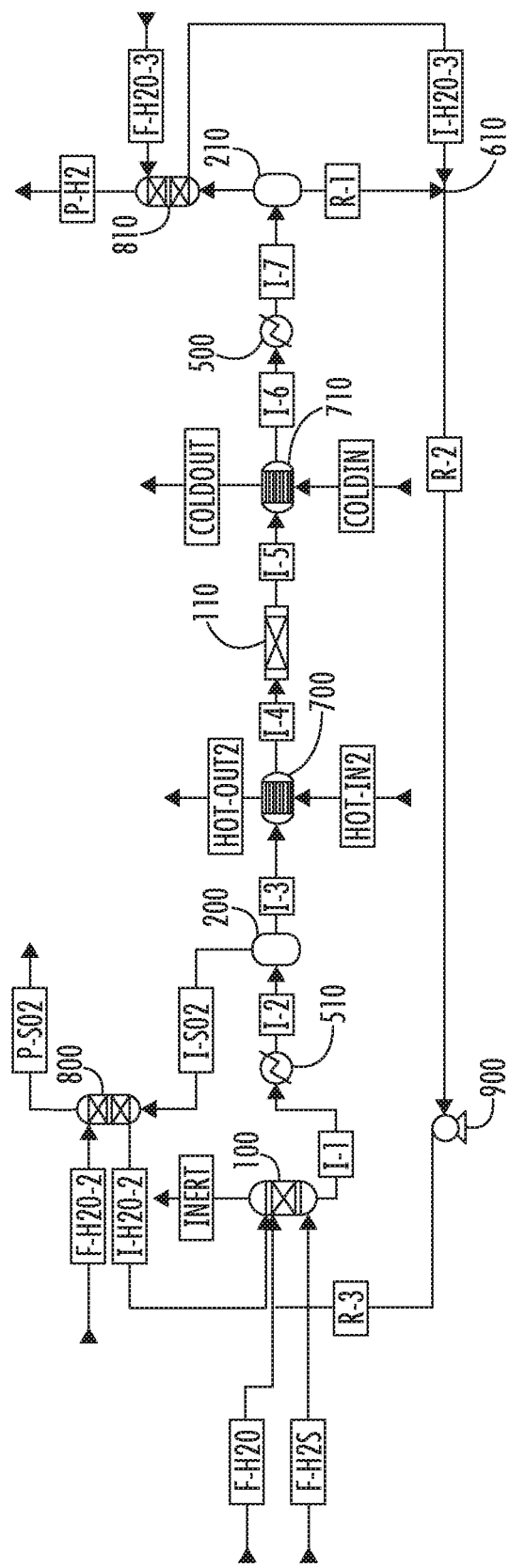
FIG. 2 is a flowchart showing the production of hydrogen gas according to a second embodiment.

Next, the dissolved sulfur dioxide is recovered and separated from the heated mixture of water and hydroiodic acid by flashing between 0.1 and 30 percent of the liquid stream to vapor at a temperature between 80 and 250 degree Celsius and a pressure between 1 and 50 bars. This may be performed by a first vapor-liquid separator, such as first flash drum 200, as shown in FIG. 1. In certain embodiments, the sulfur dioxide, denoted as P—SO2 in FIG. 1, could potentially be further purified by an absorption or adsorption unit that could use water or another polar solvent, as shown in FIG. 2. This absorbing stream could include the primary inlet or primary recycle stream. The absorption unit may be any suitable device, including but not limited to a bubble column, a Venturi scrubber, a falling film absorber, a tray column or a packed bed.

Next, the remaining liquid stream following the flash process, which comprises a $H_2O$/HI mixture and is represented as I-3 in FIG. 1, is vaporized to form gas phase hydrogen iodide. This vaporization could be accomplished using combustion furnaces, waste heat from other processes, solar thermal energy, integrated steam, or other heat sources. The heating sources, including the Heat Exchanger 400 and Furnace 300 in FIG. 1, may vaporize the entire stream or it may preferentially vaporize the hydrogen iodide. The heated gaseous hydrogen iodide is represented as I-4 in FIG. 1.

Next, the heated gaseous HI, I-4, is decomposed into $H_2$ and $I_2$. This may be achieved by the catalyzed or un-catalyzed thermal decomposition of hydrogen iodide. This thermal decomposition could occur between 200 and 700 degrees Celsius at a pressure between 1 and 50 bars. Furnace 300 may be used to heat the hydrogen iodide. The decomposition reaction, which may take place in the second reactor 110, may be catalyzed by metals, metal oxides, metal sulfides or carbon materials. The second reactor 110 may be a packed bed reactor. The decomposition reaction will convert between 10 and 25 percent of the inlet hydrogen iodide gas into hydrogen and iodine. The result of the decomposition reaction is a reactor effluent stream referred to as I-5 in FIG. 1. The reactor effluent stream, I-5, may pass through the heat exchanger 400 and emerge as I-6. This stream can then be cooled using a cooler 500 to create a cooled reactor effluent stream, represented as I-7.

Next, the produced hydrogen gas is separated from the cooled reactor effluent stream. This could be accomplished in a variety of ways, including by condensing between 50 and 99.9 percent of the cooled reactor effluent stream to liquid at between 0.5 and 50 bars, using a second vapor-liquid separator, such as second flash drum 210 of FIG. 1. In certain embodiments, the hydrogen could potentially be further purified by an absorption unit that could use water or another polar solvent. This absorbing stream could include the primary inlet or primary recycle stream. Alternatively, the separation of hydrogen from the solvent, iodine, and hydroiodic acid mixture could be accomplished by a pressure swing adsorption unit. The hydrogen product stream is represented as P—H2 in FIG. 1.

Finally, the $H_2O/I_2$/HI mixture, represented as R-1, is recycled and can be reused at the first reactor 100. In certain embodiments, a portion of this recycled $H_2O/I_2$/HI mixture, R-1, referenced as P—W, is diverted at Tee 600 to prevent the buildup of impurities in the system. The remainder, R-2, is returned to the first reactor 100.

FIG. 1 shows the use of a heat exchanger 400. The heat exchanger 400 in FIG. 1 is included for efficiency reasons. The decomposition process described herein involves performing one chemical reaction at a low temperature in the liquid phase and one reaction at a higher temperature in the vapor phase in a cycle. Therefore, it may be beneficial to use the hot stream to heat up the cold stream while the cold stream is simultaneously cooling the hot stream. It may save a majority of the heating cost of the entire process. A typical implementation of the heat exchanger 400 may be a shell and tube heat exchanger. In other embodiments, the heat exchanger 400 may not be included. Thus, the heating and cooling of the various streams is not limited to the embodiment shown in FIG. 1.

The sulfur dioxide ($SO_2$) produced by the first flash process performed in first flash drum 200, represented as P—SO2, could be sold or further reacted to make a variety of products. For example, the sulfur dioxide could be reacted with oxygen and water to form sulfuric acid through the contact process. This exothermic reaction could provide some of the heat required to vaporize the liquid stream. The sequence of chemical reactions that converts the $SO_2$ into $H_2SO_4$ is generally known as the Contact Process and includes the following reactions.

$$SO_2 + \tfrac{1}{2}O_2 \rightarrow SO_3$$

$$SO_3 + H_2SO_4 \rightarrow H_2S_2O_7$$

$$H_2S_2O_7 + H_2O \rightarrow 2H_2SO_4 \quad \text{Contact Process}$$

Alternatively, the sulfur dioxide could be mixed with additional hydrogen sulfide ($H_2S$) and catalytically reacted to form water ($H_2O$) and elemental sulfur in a Claus unit. This has the advantage of still producing hydrogen ($H_2$) but forming elemental sulfur rather than an oxygenated sulfur product. This could be useful in the case that there is a disruption in sulfuric acid production or demand but still large quantities of hydrogen sulfide to process. Further, the hydrogen sulfide and/or the $SO_2$ could be used as a feedstock in another chemical process to produce organosulfur or alkali hydrosulfide compounds.

One inlet stream to the overall hydrogen sulfide decomposition process will contain hydrogen sulfide, optionally diluted in other gases, water, or solvents and potentially impure with light hydrocarbons, carbon dioxide, carbon monoxide, or other sulfur species. The other inlet stream will contain water, but could also include iodine and a small amount of a cosolvent to help dissolve the iodine. In one embodiment, this stream comprises between 0 and 25% iodine and 0 and 10% cosolvent with the balance as water. Because hydrogen sulfide and water are the only reactants consumed across the process, in other embodiments, this inlet would be purely water in the case that the complete recycling of the iodine compounds is achieved.

The outlet streams from the hydrogen sulfide decomposition process will contain the desired products: hydrogen gas (P—H2) and sulfur dioxide (P—SO2), but may also contain other components such as water, hydrogen iodide, iodine, organic cosolvent, or other impurities. Most of the iodine co-produced with the hydrogen is preferably recycled for use as a reagent in the first reactor 100.

Thus, unlike other systems, the present hydrogen sulfide decomposition process uses iodine to produce hydrogen from hydrogen sulfide. The following is a summary of the steps used in this process:
1. $H_2S$ is reacted with $I_2$ and $H_2O$ to form dissolved HI and $SO_2$.
2. The sulfur dioxide is separated from the $H_2O/HI$ mixture.
3. The $H_2O/HI$ mixture is vaporized and the HI is decomposed into $H_2$ and $I_2$.
4. $H_2$ is separated from the $H_2O/HI/I_2$.
5. The $H_2O/I_2/HI$ mixture is recycled.
6. The $SO_2$ is optionally used to create $H_2SO_4$ through the contact process.

Thus, in summary, the present method reacts hydrogen sulfide with iodine and water to create hydrogen and sulfur dioxide. If desired, the sulfur dioxide can be further processed to form sulfuric acid. Importantly, the iodine is predominantly recycled and not net consumed by this process.

Other embodiments are also possible. FIG. 2 shows another embodiment. In this embodiment, like elements and streams have been given identical reference designators.

Additionally, the heat exchanger 400 of FIG. 1 has been replaced with dedicated heaters and coolers. Specifically, the remaining liquid stream following the flash, which comprises a $H_2O/HI$ mixture and is represented as I-3, is heated using a dedicated heater 700 to create the vaporized and heated hydrogen iodide I-4. Thus, dedicated heater 700 replaces the heat exchanger 400 and the furnace 300 of FIG. 1. In certain embodiments, the hot fluid that feeds the dedicated heater 700 may be the result of a different chemical process within the plant.

Similarly, a dedicated cooler 710 replaces the heat exchanger 400 of FIG. 1. The result of the decomposition reaction that occurs in the second reactor 110 is a reactor effluent stream referred to as I-5. This reactor effluent stream I-5 is cooled by the dedicated cooler 710 to create a cooled effluent stream, represented as I-6. In certain embodiments, the cold fluid that feeds the dedicated cooler 710 may be the result of a different chemical process within the plant. In other embodiments, this cooler 710 may generate steam by absorbing the heat from I-5.

Of course, the system may include heat exchangers, dedicated heaters and coolers, or a combination of the two.

FIG. 2 also shows a purification stage for the sulfur dioxide. In certain embodiments, the sulfur dioxide, denoted as P—SO2 in FIG. 2, could potentially be further purified by an absorption unit 800 that could use water or another polar solvent. As noted above, in certain embodiments, an adsorption unit may be utilized rather than absorption unit 800.

FIG. 2 also shows a similar purification stage of the hydrogen gas. An absorption unit 810 may be used to purify the hydrogen gas. In the case that water was used as the absorbing liquid, effluent from this absorber could optionally be combined with the recycle using tee 610. In certain embodiments, an adsorption unit may be utilized rather than absorption unit 810.

Finally, FIG. 2 also shows a pump 900 that receives the recycled $H_2O/I_2/HI$ mixture, labelled R-2, and pumps this mixture to the first reactor 100.

Any or all of these additional features may be included in the process.

The present method has many advantages. One alternative process combines hydrogen sulfide with iodine to create hydroiodic acid and sulfur. The equation of this reaction is $H_2S + I_2 \rightarrow 2HI + S$. Thus, in alternative systems, each molecule of hydrogen sulfide creates two molecules of hydroiodic acid and one molecule of sulfur. In contrast, the present system introduces water such that hydroiodic acid is created by the equation $H_2S + 3I_2 + 2H_2O \rightarrow 6HI + SO_2$. In other words, each molecule of hydrogen sulfide produces 6 molecules of hydroiodic acid. Thus, the present system is able to generate three times as much hydrogen from the same amount of hydrogen sulfide.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of decomposing hydrogen sulfide, comprising:
   reacting hydrogen sulfide with water and iodine to create sulfur dioxide and hydroiodic acid.

2. The method of claim 1, further comprising reacting the hydroiodic acid to form hydrogen gas.

3. The method of claim 1, wherein the sulfur dioxide is subjected to a contact process to create sulfuric acid.

4. The method of claim 1, wherein the sulfur dioxide is reacted with additional hydrogen sulfide to form elemental sulfur.

5. The method of claim 1, wherein a liquid stream is created by the reacting, and the sulfur dioxide is separated from the liquid stream.

6. The method of claim 5, wherein the sulfur dioxide is separated by partially flashing the liquid stream.

7. The method of claim 1, wherein the hydroiodic acid is subjected to a vaporization process to form gaseous hydrogen iodide.

8. The method of claim 7, wherein the gaseous hydrogen iodide is decomposed into a reactor effluent stream comprising hydrogen gas and iodine.

9. The method of claim 8, wherein the decomposition is performed using a catalyst.

10. The method of claim 8, wherein the decomposition comprises a thermal decomposition.

11. The method of claim 8, wherein the hydrogen gas is separated from the reactor effluent stream.

12. The method of claim 11, wherein the hydrogen gas is separated using a flash process.

13. The method of claim 11, wherein a remainder of the reactor effluent stream is recycled to react with additional hydrogen sulfide.

14. A method of creating hydrogen from hydrogen sulfide, comprising:
   contacting hydrogen sulfide with water and iodine to create sulfur dioxide and hydroiodic acid; and
   decomposing the hydroiodic acid to create hydrogen gas.

15. A chemical plant to create hydrogen from hydrogen sulfide, comprising:
   a first reactor to react the hydrogen sulfide with iodine and water to form a mixture of dissolved hydroiodic acid and sulfur dioxide;
   a first vapor-liquid separator to separate the sulfur dioxide from the mixture;
   a second reactor to dissociate the hydroiodic acid into a reactor effluent stream comprising hydrogen and iodine; and
   a second vapor-liquid separator to separate the hydrogen from the reactor effluent stream.

16. The chemical plant of claim 15, further comprising an absorption or adsorption unit to purify the sulfur dioxide.

17. The chemical plant of claim 15, further comprising an absorption or adsorption unit to purify the hydrogen.

18. The chemical plant of claim 15, further comprising a heater disposed between the first vapor-liquid separator and the second reactor to heat the hydroiodic acid.

19. The chemical plant of claim 15, further comprising a cooler disposed between the second reactor and the second vapor-liquid separator to cool the reactor effluent stream.

* * * * *